(12) United States Patent
Chen et al.

(10) Patent No.: US 8,843,653 B2
(45) Date of Patent: Sep. 23, 2014

(54) INTERACTIVELY COMMUNICATING A MEDIA RESOURCE

(75) Inventors: Rebecca L J Chen, Taipei (TW); Jeffrey C H Liu, Taipei (TW); Joey H Y Tseng, Taipei (TW); Jim C L Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 13/043,410

(22) Filed: Mar. 8, 2011

(65) Prior Publication Data
US 2012/0059872 A1     Mar. 8, 2012

(30) Foreign Application Priority Data

Mar. 30, 2010 (TW) .............................. 99109561 A

(51) Int. Cl.
G06F 15/16 (2006.01)
H04L 12/58 (2006.01)
H04L 29/08 (2006.01)

(52) U.S. Cl.
CPC .............. *H04L 12/581* (2013.01); *H04L 51/04* (2013.01); *H04L 67/02* (2013.01); *H04L 12/5805* (2013.01)
USPC ........................... 709/232; 709/206; 709/231

(58) Field of Classification Search
CPC .......... H04N 21/4782; H04N 21/4702; H04N 21/4758; H04N 21/4312; H04N 21/4316; H04N 21/4438; H04N 21/485; H04N 7/173; H04L 12/581; H04L 51/04; H04L 67/02; H04L 12/5805; H04L 41/22; H04L 51/02
USPC .................................................. 709/206, 231
See application file for complete search history.

(56) References Cited

U.S. PATENT DOCUMENTS

| 2009/0164641 | A1 | 6/2009 | Rogers et al. |
| 2009/0248860 | A1 | 10/2009 | Song et al. |
| 2010/0002685 | A1* | 1/2010 | Shaham et al. ............... 370/352 |

FOREIGN PATENT DOCUMENTS

| TW | 200948069 A | 11/2009 |
| TW | 200949567 A | 12/2009 |

OTHER PUBLICATIONS

RFC 5168 "XML Xchema for Media Control" Levin et al, Mar. 2008, p. 1-10.*

* cited by examiner

*Primary Examiner* — Karen Tang
(74) *Attorney, Agent, or Firm* — Van Leeuwen & Van Leeuwen; Jeanine S. Ray

(57) ABSTRACT

An approach is provided for communicating a media resource. The approach includes generating a widget information in response to a request by a user, associating the widget information with at least a portion of a media resource; encoding at least a portion of the media resource for a real-time exchange of communications, and transmitting at least a portion of the media resource and the widget information from one information handling system to another.

16 Claims, 7 Drawing Sheets

INTERACTIVELY COMMUNICATING A MEDIA RESOURCE

RELATED APPLICATION

This application is based on and claims the benefit of priority from Taiwan Patent Application 99109561, filed Mar. 30, 2010.

BACKGROUND

A media file is typically used for storing media data and for transmission through communication networks. The media file may be a photo, audio or video data, or other similar type of file. The media files may be encoded in accordance with pre-defined standards, and there are various encoding formats therefore. In general, CODECs (coder-decoder) are generally software modules which can encode data from a raw format into a compressed format, and then can decode such data to allow for processing of the raw data when it is used. For the purpose of easy transmission, the media data typically are compressed so that the media file has a smaller size.

In conventional transmission techniques of media resources, the transmitted data are only photo data, audio data, or video data, and interactive communication cannot be achieved. For example, with respect to the operations and actions related to the transmitted media files, additional means (e.g., other communication devices) by the transmitters and receivers are required for further communication, selection, and/or confirmation.

BRIEF SUMMARY

An embodiment of the present invention provides a computer-implemented method for a communication of a media resource by generating a widget information in response to a request by a user of a first information system, associating the widget information with at least a portion of the media resource, encoding the at least a portion of the media resource for a real-time exchange of communications between a plurality of information handling systems, and transmitting the at least a portion of the media resource and the widget information from the first information handling system to at least one of the plurality of information handling systems. Another embodiment of the present invention also provides a computer program product for a communication of a media resource, and the computer program product may include stored code for the above described method. Another embodiment of the present invention provides an information handling system for carrying out the above described method.

BRIEF DESCRIPTION OF THE DRAWINGS

A more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings.

DETAILED DESCRIPTION

Figure 1:
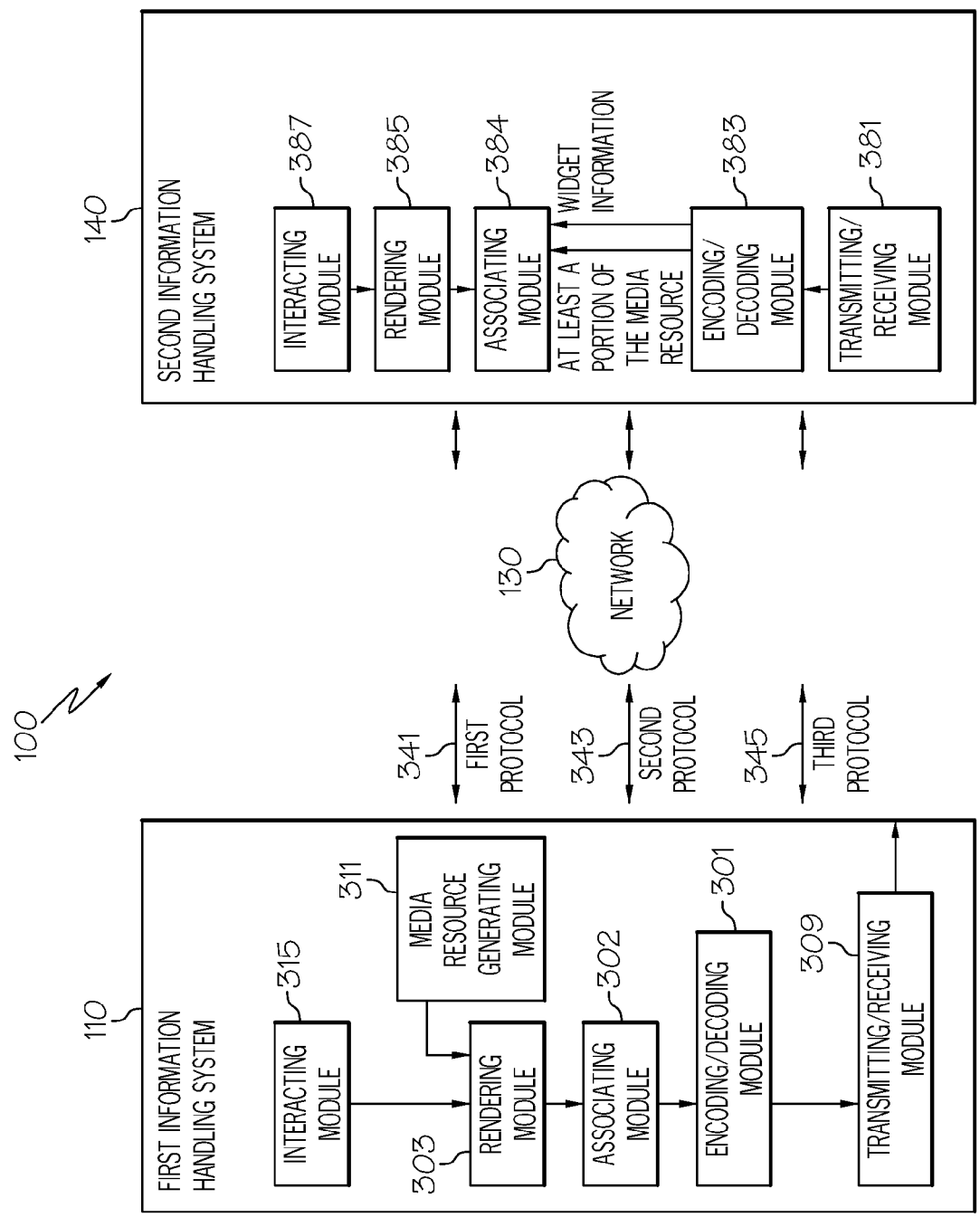
FIG. 1 is an exemplary diagram of a network system according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. ("Java" is a registered trademark of Sun Microsystems, Inc. in the United States, other countries, or both.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 7, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an exemplary diagram of a network system 100 according to an embodiment of the present invention. Network system 100 includes a first information handling system 110, a second information handling system 140, and a network 130. The network 130 may include connection modules which may be, but are not limited to, electrical or optical conductors, cables, wireless communications, etc. In this exemplary embodiment, the first information handling system 110, the second information handling system 140, and the network 130 are using conventional wire/wireless communication networks for connection and transmission. The connection and transmission can be implemented by any hardware architectures and software protocols. For example, the internet and TCP/IP protocols are used for connection and transmission, wireless technologies such as GSM/GPRS, 3G, and Wimax are used for connection and transmission, and other connection/transmission technologies may also be implemented without departing from the scope and spirit of the invention. In the exemplary embodiment, the network system 100 may include additional servers, clients, or any other devices. One skilled in the art should recognize that the types of services provided by the servers are not limited. One skilled in the art should recognize that the number of the information handling systems 110 and 140 are not limited. The exemplary embodiments are given to enable those skilled in the art to more clearly understand and to practice the present invention. They should not be considered as limiting the scope of the invention, but merely as being illustrative and representative thereof.

Figure 2:
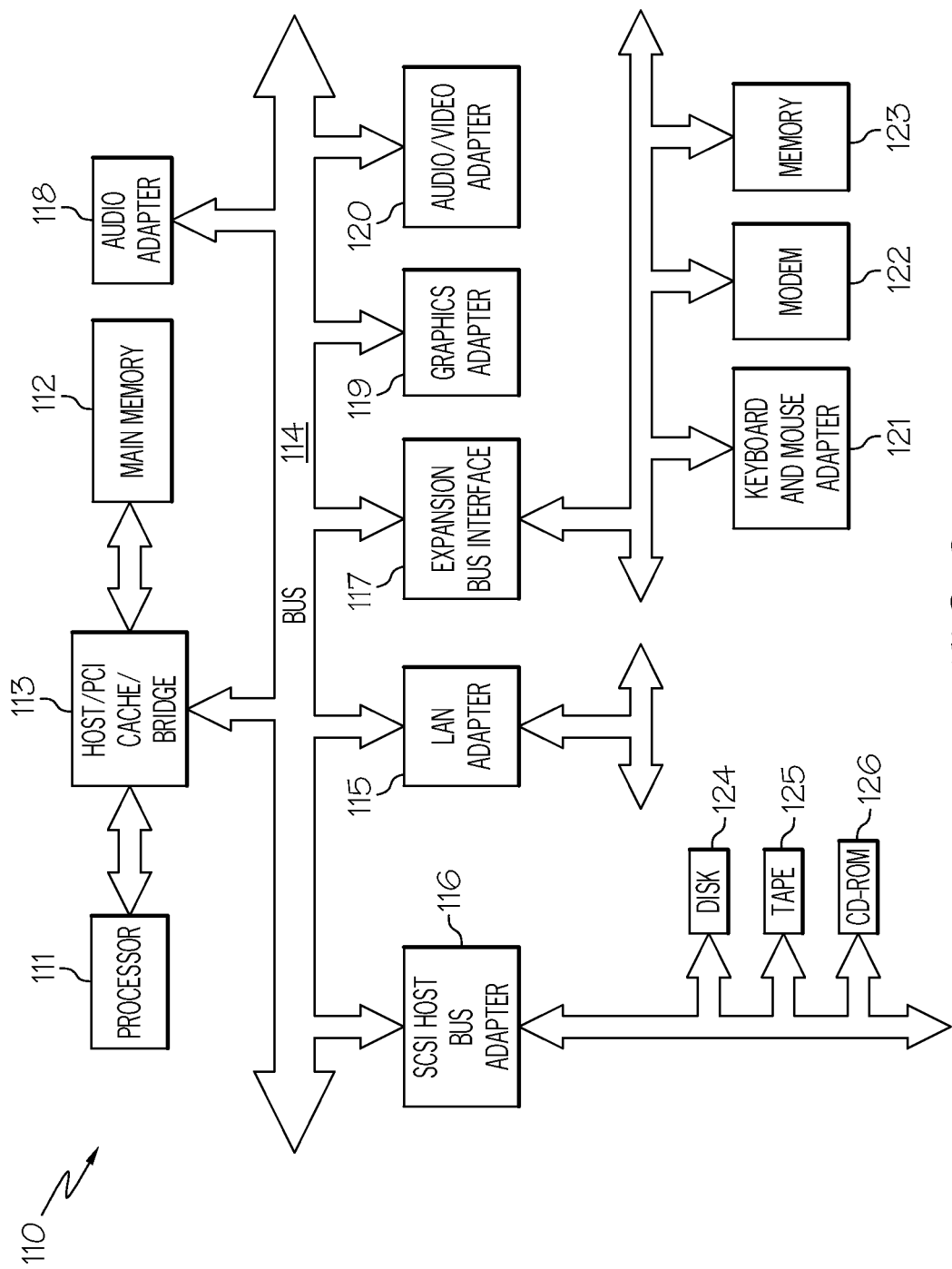
FIG. 2 is an exemplary diagram of one information handling system according to an embodiment of the present invention.

In the exemplary embodiment, the first information handling system device 110 and the second information handling system device 140 may respectively be, but are not limited to, a personal computer, a network computer, a hand-held device, a cell phone, a smart phone, an electronic dictionary, a game system, a PDA, and so on. FIG. 2 shows an exemplary diagram of the information handling system 110/140 according to an embodiment of the present invention. In this example, the information handling system 110/140 is a general-purpose computer, in which code or instructions implementing processes of the present invention may be located. The information handling system 110 employs a peripheral component interconnects (PCI) local bus architecture. Although the depicted example employs a PCI bus, other bus architectures such as Accelerated Graphics Port (AGP) and Industry Standard Architecture (ISA) may be used. Processor 111 and main memory 112 are connected to PCI local bus 114 through PCI Bridge 113. PCI Bridge 113 also may include an integrated memory controller and cache memory for processor 111. Additional connections to PCI local bus 113 may be made through direct component interconnection or through add-in boards.

In the depicted example, local area network (LAN) adapter 115, small computer system interface (SCSI) host bus adapter 116, and expansion bus interface 117 are connected to PCI local bus 114 by direct component connection. In contrast, audio adapter 118, graphics adapter 119, and audio/video adapter 120 are connected to PCI local bus 114 by add-in boards inserted into expansion slots. Expansion bus interface 117 provides a connection for a keyboard and mouse adapter 121, modem 122, and additional memory 123. SCSI host bus adapter 116 provides a connection for hard disk drive 124, tape drive 125, and CD-ROM drive 126. Typical PCI local bus implementations will support three or four PCI expansion slots or add-in connectors.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system. For example, the information handling system 110/140, if optionally configured as a network computer, may omit SCSI host bus adapter 116, hard disk drive 124, tape drive 125, and CD-ROM 126. In that case, the computer, often referred to as a client computer, includes some type of network communication interface, such as LAN adapter 115, modem 122, or the like. The depicted example in FIG. 2 and above-described examples are not meant to imply architectural limitations.

Figure 5:
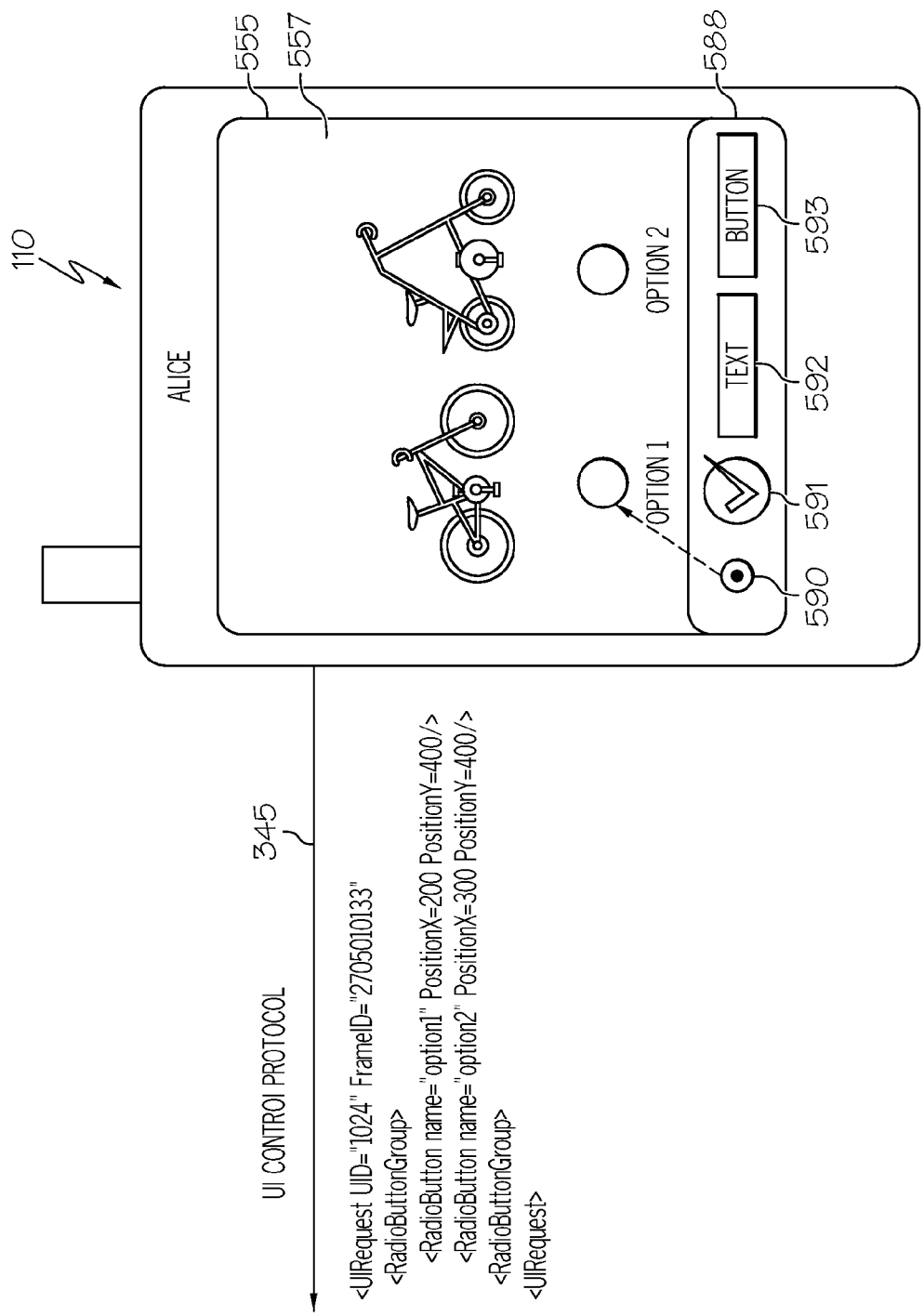
FIG. 5 illustrates an application according to one embodiment of the present invention.
Figure 6:
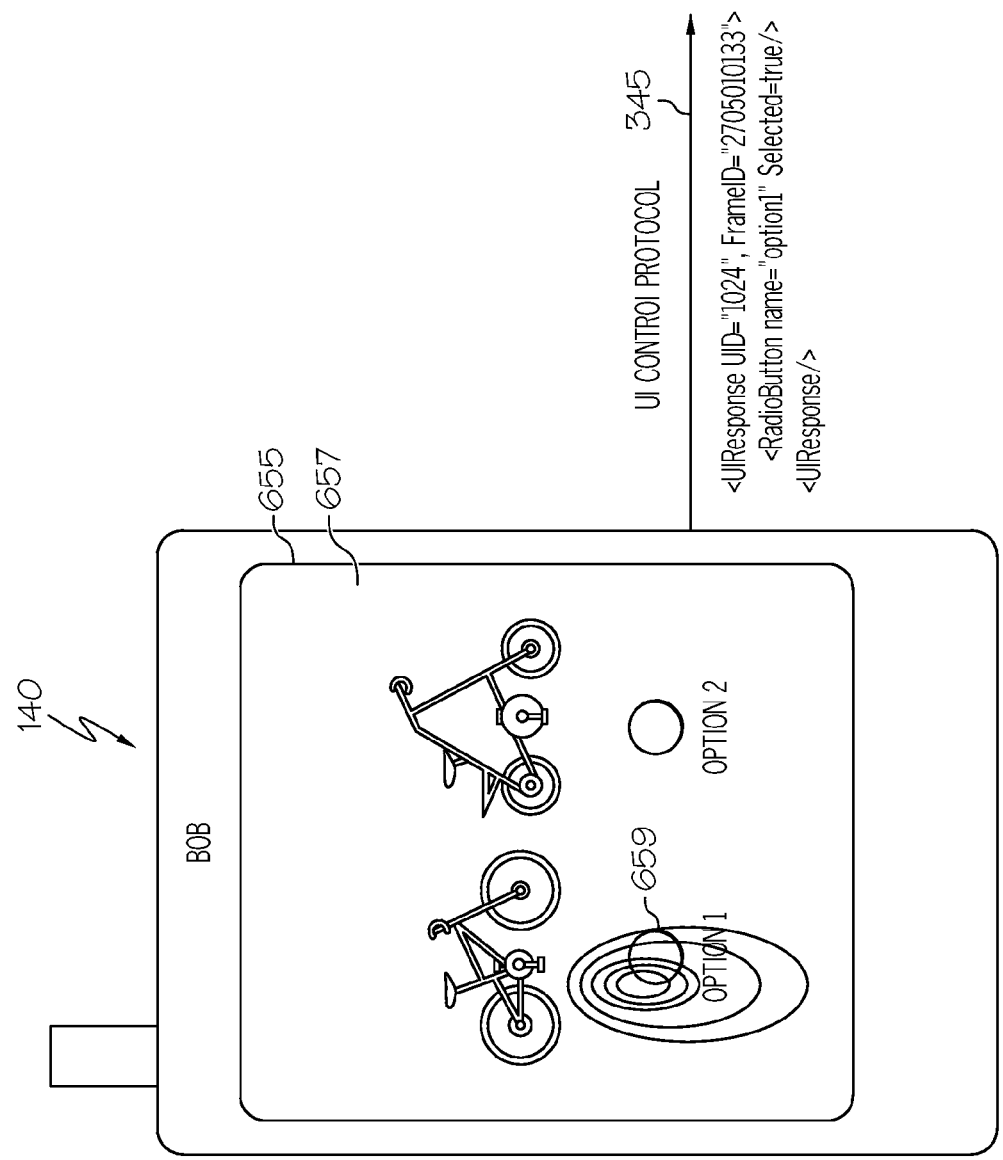
FIG. 6 illustrates an application according to one embodiment of the present invention.

FIG. 1 further shows a first information handling system 110 and a second information handling system 140 for communicating a media resource and the block diagrams thereof. As described above, the first information handling system 110, the second information handling system 140, and the network 130 are connected and communicated by any hardware architectures and software protocols. In the depicted example, the first information handling system 110 and the second information handling system 140 may respectively be a mobile device, such as, but not limited to, a mobile phone, a smart phone, and a PDA. The first information handling system 110 may comprise a media resource generating module 311, an encoding/decoding module 301, an associating module 302, a rendering module 303, an interaction module 315, and a transmitting/receiving module 309. The second information handling system 140 may comprise a transmitting/receiving module 381, an encoding/decoding module 383, an associating module 384, a rendering module 385, and an interaction module 387. Please also refer to FIG. 5, which illustrates an application according to one embodiment of the present invention and a display 555 having a display area 557. Similarly, FIG. 6 illustrates an application according to one embodiment of the present invention and a display 655 having a display area 657.

A graphical widget is understood as a component of a graphical user interface providing a specific way for a user to interact with an application displaying information. The graphical widget may be related to a graphical user interface component, a control program thereof, or a combination thereof. FIG. 5 shows a graphical user interface 588 for user interaction, and the graphical user interface 588 may be, but is not limited to, a tool bar, wherein several draggable and droppable graphical widgets are shown: radio 590, check boxes 591, text inputs 592, and buttons 593. Other graphical widget components for inviting, accepting, and responding to user actions and for displaying information, such as icons, pull-down menus, selection boxes, progress indicators, scrollbars, windows, window edges, toggle buttons, and form inputs, may also be used.

Returning to FIG. 1, the above communication is communicated on an internet protocol (IP), and the communicated media resource may include packages of media data. For example, the internet protocol may include a first protocol 341 for the media data, a second protocol 343 for controlling the media data, and a third protocol 345 for the widget information. The first protocol 341 may be, but is not limited to, a Real-time Transport Protocol (RTP) which is used to transmit real-time encoded media contents. The second protocol 343 may be, but is not limited to, a Real-time Control Protocol (RTCP) which is used to control the media session. The third protocol 343 may be, but is not limited to, a user interface (UI) control protocol for a real-time exchange of the widget information in a session. As for the definition of the user interface control, since there are various XML-based (eXtensible Markup language-based) UI languages in the market, publicly available user interface control protocols are used herein. Also a further explanation on XML-based UI languages may be found in the following:
https://developer.mozilla.org/en/xul; and
http://en.wikipedia.org/wiki/List_of_user_interface_markup_languages.

In an exemplary embodiment, the media resource generating module 311 is used to generate one or more media resources which include, for example, but are not limited to, audio contents, still image contents, animation contents, video contents, text contents, interactive contents, or a combination thereof. The media resource generating module 311 may be, but is not limited to, a music player, sound recorder, a digital camera, and so on. The media resource generating module 311 may be selectively coupled to a display module for displaying the media resource. Referring to FIG. 5, the display module of the first information handling system 110 may be, but is not limited to, a display 555, and the display 555 has a display area 557. At least one portion of the media resource may be displayed on the display area 557. Similarly, referring to FIG. 6, the display module of the second information handling system 140 may be, but is not limited to, a display 655, and the display 655 has a display area 657. At least one portion of the media resource may be displayed on the display area 657.

Returning to FIG. 1, in response to a request by the user of the first information handling system 110, the interacting module 315 may allow the user to input the instructions related to the media resources and further to generate the widget information. The interacting module 315 may be, but is not limited to, a graphic user interface having at least a graphic widget. User operations may be, for example, but are not limited to, a drag-and-drop action whereby the user may select and use proper graphical widget(s). The drag-and-drop operation in general is known to those skilled in the art. Please also refer to FIG. 5. The graphical user interface may be, but is not limited to, a toolbar 588. The graphical widgets may be, but are not limited to, radio buttons 590, check boxes 591, text inputs 592, buttons 593, icons, pull-down menus, selection boxes, progress indicators, scrollbars, windows, window edges, toggle buttons, form inputs, or other graphical widget components for inviting, accepting, and responding to user actions and for displaying information. These techniques and the implementations thereof are known to those skilled in the art and thus they are not described further herein.

Returning to FIG. 1, the associating module 302 may associate the widget information with at least a portion of the media resource. The rendering module 303 may compose at least a portion of the media resource and the widget related to the associated widget information for rendering. Thus, at least a portion of the media resource and the related graphical widget may be simultaneously displayed on the display 555 (see FIG. 5). The graphical widget may be arranged on at least a portion of the media resource by known "layer superposition" technology. The "layer superposition" operation of the graphical widget on at least a portion of the media resource in general is known to those skilled in the art and thus this aspect is not described further herein. The encoding/decoding module 301 may encode at least a portion of the media resource for a real-time exchange of communications between information handling systems. The transmitting/receiving module 309 may transmit at least a portion of the media resource and the widget information from the first information handling system 110 to other information handling systems, for example, the second information handling system 140. The above communication may be communicated on a specific protocol, for example, a specific protocol with a first protocol 341 for the media data, a second protocol 343 for controlling the media data, and a third protocol 345 for the widget information. In the transmitting step, the widget information may include one or more of the following: an ID identifying the request; an ID identifying at least a portion of the media resource; and information identifying at least one widget related to at least a portion of the media resource.

Transmitting/receiving module 381 may receive signals (for example, the media content). The encoding/decoding module 383 may decode the signals from transmitting/receiving module 381 to obtain at least a portion of the media resource and the associated widget information. The associating module 384 may associate the widget information with at least a portion of the media resource. The rendering module 385 may compose at least a portion of the media resource and the associated widget information so that the graphical widget and at least a portion of the media resource may be simultaneously displayed on the display 655 (see FIG. 6). The graphical widget may be arranged on at least a portion of the media resource by known "layer superposition" technology. The process for "layer superposition" operation would be apparent to one skilled in the art and thus is not described further herein.

Figure 3:
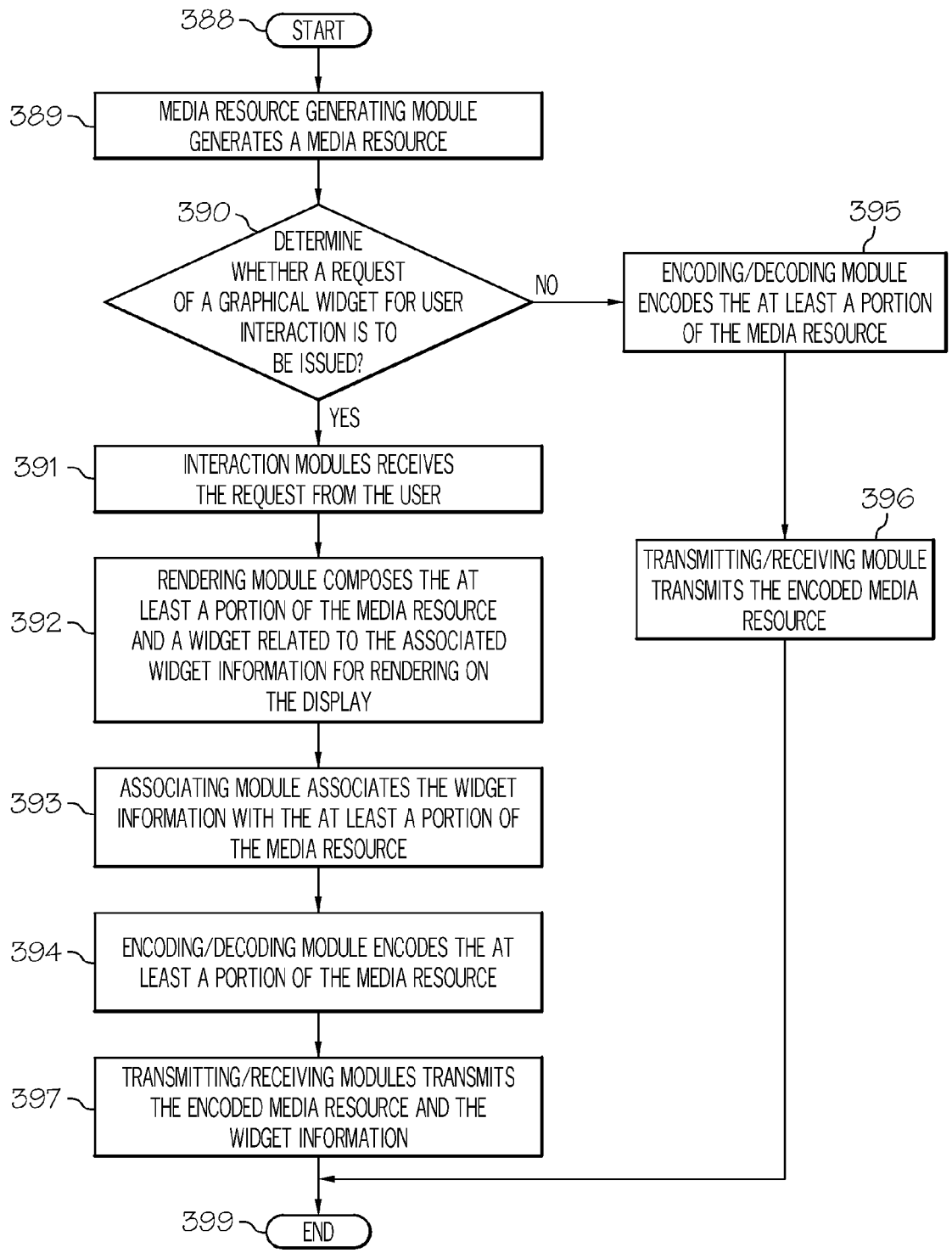
FIG. 3 illustrates a block diagram of one information handling system interactively transmitting a media file according to an embodiment of the present invention.
Figure 4:
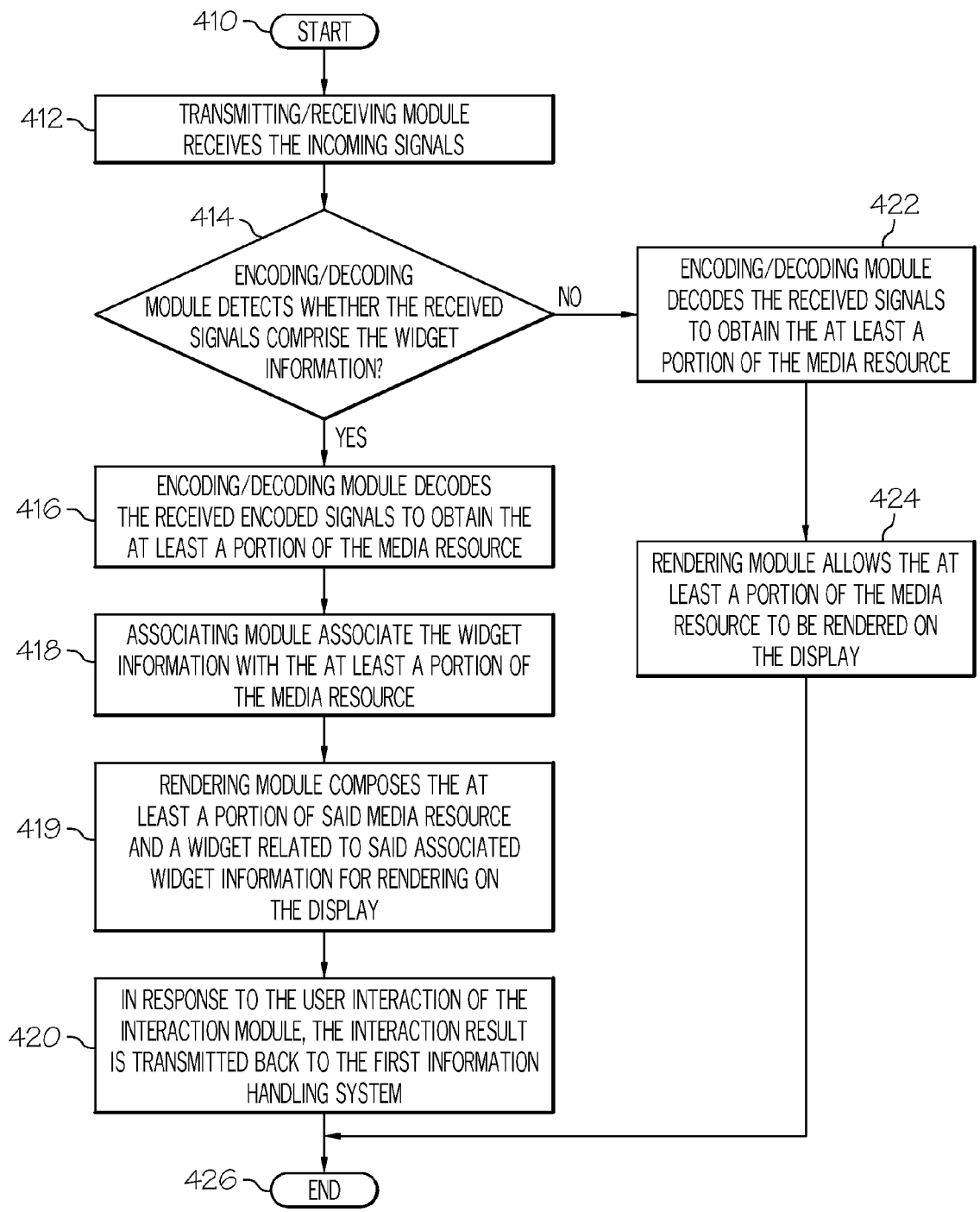
FIG. 4 illustrates a block diagram of one information handling system interactively receiving a media file according to an embodiment of the present invention.

FIG. 3 and FIG. 4 illustrate block diagrams according to embodiments of the present invention. In FIG. 3, a computer-implemented method for transmitting a media resource is described. The method starts at step 388. In step 389, the media resource generating module 311 generates a media resource. In step 390, the user of the first information handling system 110 determines whether a request of a graphical widget for user interaction is to be issued. If not, the encoding/decoding module 301 encodes the at least a portion of the media resource (step 395) and the transmitting/receiving module 309 transmits the encoded media resource (step 396). If yes, the interaction module 315 receives the request from the user (step 391). In step 392, the rendering module 303 composes the at least a portion of the media resource and a widget related to the associated widget information for rendering on the display 555. In step 393, the associating module 302 associates the widget information with the at least a portion of the media resource. The steps 392 and 393 are interchangeable. In step 394, the encoding/decoding module 301 encodes the at least a portion of the media resource. In step 397, the transmitting/receiving module 309 transmits the encoded media resource and the widget information. The method then ends at step 399.

Note that the associating module 302 keeps the information of out-going requests and performs any bookkeeping actions. An example format of the association would be: <UI_REQ_ID, FRAME_ID, UI_REQUEST_REF, EXPIRE>, where UI_REQ_ID is the ID that uniquely identifies the request; FRAME_ID is the ID that uniquely identify a specific frame; UI_REQUEST_REF is the location where the original request was stored (it may be for example stored in file system or in memory), and EXPIRE is the time when the request will be expired.

In an exemplary embodiment, a unique "FrameID" is used to uniquely identify a specific frame at a specific moment. For example, if RTP is used as the media transport protocol, this could be the combination of 16 bit "Sequence Number" and 32 bit "Timestamp". Each UI request will be associated with an auto-generated, globally unique UI Request ID. Therefore, UI request generated by UI CODEC will contain the association of UI request and the right "frame". The association of FrameID and UI Request ID will be stored in the Pending UI Request Registry for future reference and for future user interaction.

In FIG. 4, a computer-implemented method for receiving a media resource is described. The method starts at step 410. In step 412, the transmitting/receiving module 381 receives the incoming signals. In step 414, the encoding/decoding module 383 receives/detects whether the received signals includes the widget information. If not, the encoding/decoding module 383 decodes the received signals to obtain the at least a portion of the media resource (step 422), and the rendering module 385 allows the at least a portion of the media resource to be rendered on the display 655 (step 424). If yes, the encoding/decoding module 383 decodes the received encoded signals to obtain the at least a portion of the media resource (the received signals also includes the widget information) (step 416). In step 418, the associating module 384 associates the widget information with the at least a portion of the media resource. The steps 416 and 418 are interchangeable. In step 419, the rendering module 385 composes the at least a portion of the media resource and a widget related to the associated widget information for rendering on the display 655, such as simultaneously displaying the graphical widget and the at least a portion of the media resource on the display 655. In step 420, in response to the user interaction of the interaction module 387, the interaction result is transmitted back to the first information handling system 110. Then the method ends at step 426.

Referring again to FIG. 1, in the exemplary embodiment, the media resource may be, but is not limited to, packages of media data, and the used internet protocol may include a first protocol of Real-time Transport Protocol (RTP) for the media data, a second protocol of Real-time Control Protocol (RTCP) for controlling the media data, and a third protocol for the widget information, e.g., a user interface control protocol based on XML. Each of the above protocols is allocated for a part of a transmission bandwidth.

For example, before the first information handling system 110 transmits data packets, a multicast address and plural ports are to be obtained. One of the ports is used for RTP packets (e.g., video packets). One of the ports is used for RTCP (RTP control protocol) packets (e.g., Quality of Service (QoS) control packets). In one embodiment, by the transmission of QoS packets, the transmission quality will not be limited by bandwidth, delay, packet loss, and so on. One of the ports is used for UI control packets based on XML (Extensible Markup Language), for transmitting the widget information.

In one exemplary embodiment, the audio packet and the video packet may include an IP (Internet Protocol) header, a TCP (Transmission Control Protocol) header, an RTP (Real-time Transport Protocol) header, and an RTP payload. As defined in RFC 1889, the basic principles of RTP are well known by the skilled in the art. Also a further explanation on RTP may be found in the following: http://www.faqs.org/rfcs/rfc1889.html.

Also in the embodiment in FIG. 1, the encoding/decoding module 301 of the first information handling system 110 (the sender) may be implemented by an AV (Audio/Video) CODEC and an UI (User Interface) CODEC, and the encoding/decoding module 383 of the second information handling system 140 (the receiver) may be implemented by an AV (Audio/Video) CODEC and an UI (User Interface) CODEC. In general, the AV CODEC is the component that actually handles image encoding and decoding using a specific CODEC standard. The image quality, frame rate, and required bandwidth might vary depending on the CODEC of choice.

Regarding UI CODEC, for the sender, the UI CODEC is responsible for translating the UI control information composed in real time into the standard XML format and sending the result to the receiving party. For the receiver, the UI CODEC is responsible for parsing the encoded UI control information and obtaining the media data and UI control information (widget information) so that the media data and UI control information (widget information) may be sent to the associating module 384.

The transmitting/receiving module 309 of the sender and the transmitting/receiving module 381 of the receiver may be implemented by known transmitting/receiving techniques. Similarly, the display 555 of the first information handling system 110 and the display 655 of the second information handling system 140 may be implemented by known display technology. These techniques and the implementations thereof are known to those skilled in the art and thus they are not described further herein.

In the embodiment in FIG. 1, the interaction module 315 of the sender may be implemented by a UI handler, and the interaction module 387 of the receiver may be implemented by a UI handler. In general, the UI Handler deals with rendering pre-defined graphical widgets and processing the user interaction of the graphical widget. For the sender, it provides available widget options to the user to compose UI layouts in real time. In later operations, the UI handler may compose the selected graphical widget and the media resource for a future rendering on the display. Referring to FIG. 5, the UI handler may work as the toolbar 588 and the graphical widgets may include radio button 590, check box 591, text input 592, and button 593. For the receiver, the UI Handler will take the user's UI actions and send the result to the UI CODEC to generate the UI response which will be sent back to the request sender.

In the embodiment in FIG. 1, the associating module 302 and the rendering module 303 of the sender may be implemented by a UI control handler, and the associating module 384 and the rendering module 385 of the receiver may be implemented by a UI control handler. In general, for the sender, after the graphical widget is selected, in response to the user interaction of the interaction module, the UI control handler receives at least a portion of the media resource parsed by the UI CODEC, for example, a frame, and the UI control information. The widget information is associated with the frame and the UI control handler may render the composing result on the receiver's display based on the widget information and frame. In response to user interface action of the receiver, the interaction result is transmitted from the receiver back to the sender, and the UI control handler may render the composing result on the receiver's display.

Figure 7:
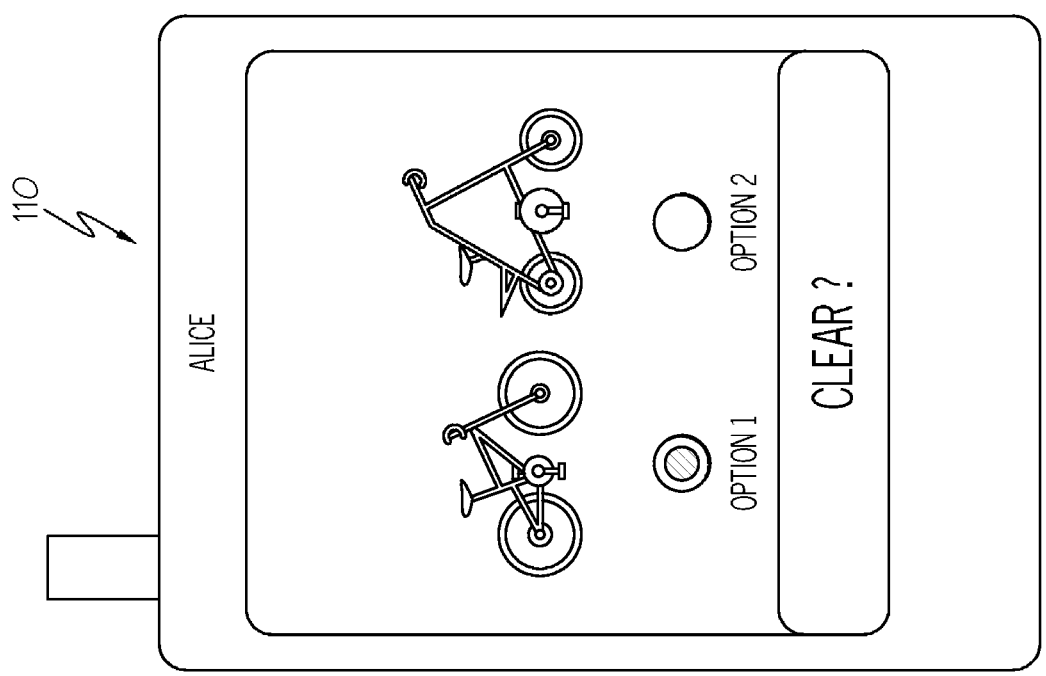
FIG. 7 illustrates an application according to one embodiment of the present invention.

An application according to one embodiment of the present invention is shown in FIGS. 5, 6, and 7. Assuming Alice and Bob are using their cell phones for video chatting. Alice is in a mall and she would like to buy a new bike. She sees two candidates that are hanging on the wall. Alice would like to know if Bob has any suggestion, so she targets the two bikes and takes photos with her cell phone. To make sure Bob is clear which bikes require his suggestion, Alice uses the toolbar 588 having radio button 590, check box 591, text input 592, and button 593. By using the toolbar and a drag operation, Alice respectively drags a radio button for each of the bikes. In one embodiment, the photos of the two bikes and the radio button 590 may be transmitted to Bob by the first protocol 341 for the media data, the second protocol 343 for controlling the media data, and the third protocol 345 for the widget information. FIG. 5 also illustrates an exemplary program for implementing the above operations. The UI control layout then is sent to Bob using the UI control channel. As can be seen, a unique UI Request (1024) is generated and is associated with a corresponding Frame ID (2705010133):

```
<UIRequest UID="1024" FrameID="2705010133"
   <RadioButtonGroup>
      <RadioButton name="option1" PositionX=200 PositionY=400/>
      <RadioButton name="option2" PositionX=300 PositionY=400/>
   <RadioButtonGroup>
<UIRequest>
```

FIG. 6 illustrates the composed result on Bob's phone. In this embodiment, the radio buttons are arranged above the photos by layer superposition technology. The layer superposition operation may be implemented by known superposition technology which in general is known to those skilled in the art and thus this aspect is not described further herein. When Bob's cell phone receives the GUI configuration, the UI CODEC first parses the XML based configuration and then displays the interaction request contents on the display of his mobile phone. In the circumstance of the display being a touch display, Bob uses the touch screen to make his recommendation. Once clicked, the result, typically in the same XML format, will be sent back to Alice. An exemplary program is shown below. The touch implementation of the touch display may be achieved by known touch display technology which in general is known to those skilled in the art and thus this aspect is not described further herein.

```
<UIResponse UID="1024" FrameID="2705010133">
   <RadioButton name="option1" Selected=true/>
   <UIresponse/>
```

In FIG. 7, once Alice's cell phone receives Bob's response, the UI CODEC will parse the response and display it on the display of her phone. Therefore, Alice knows which bike Bob recommends. After the interaction process is done, Alice can clear all the widgets on both her screen and Bob's screen as shown in FIG. 7. The process for the clear operation would be apparent to one skilled in the art and thus is not described further herein.

Please refer again to FIGS. 5-7. In another exemplary embodiment, Alice may target the two bikes and record a video with her cell phone and also activate the toolbar 588 to select the radio button 659 in a "real time" way. The selection may be a drag-and-drop operation as in the previous embodiment. In this embodiment, although the media resource comprises video data (which are dynamic), the video data and the radio buttons can still be composed similar to the previous embodiment.

In the above two embodiments, the still image content and the video content are respectively used as the media resource. However, various contents may also be used, for example, but not limited to, audio contents, still image contents, animation contents, video contents, text contents, interactive contents, or a combination thereof. The media resource may be integrally transmitted (for example, the whole content of a still image). The media resource may be partially transmitted (for example, some frames of a video). The present invention can be applied to various fields, for example, but not limited to, video communication, video conference, IP (internet protocol) TV, and so on.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A computer-implemented method for a communication of a media resource, the method comprising:
   receiving a request, from a user of a first information handling system, for a user manipulation on at least a portion of the media resource;
   receiving a selection, from the user, of at least one widget of a graphic user interface, wherein the at least one widget is draqqed and dropped to a location on the at least a portion of the media resource;
   generating a widget information corresponding to the at least one widget in response to the request;
   associating the widget information with the at least a portion of the media resource;
   encoding the at least a portion of the media resource for a real-time exchange of communications between a plurality of information handling systems; and
   transmitting the at least a portion of the media resource and the widget information from the first information handling system to at least one of the plurality of information handling systems.

2. The method of claim 1, wherein the widget information comprises an ID identifying the request, an ID identifying the at least a portion of the media resource, and information identifying the at least one widget related to the at least a portion of the media resource.

3. The method of claim 1, wherein the first information handling system comprises a display and the display comprises a display area for displaying the at least a portion of the media resource, and wherein the at least one widget and the at least a portion of the media resource are simultaneously displayed on the display area.

4. The method of claim 1, wherein the media resource comprises a media file, wherein one or more contents of the media file are selected from the group consisting of audio contents, still image contents, animation contents, video contents, text contents, and interactive contents.

5. The method of claim 1, wherein the at least one widget comprises a component for displaying information and for inviting, accepting, and responding to user actions, and wherein the at least one widget is selected from the group consisting of buttons, icons, pull-down menus, radio buttons, selection boxes, progress indicators, check boxes, scrollbars, windows, window edges, toggle buttons, text inputs, and form inputs.

6. The method of claim 1, wherein the graphic user interface is used for a user interaction with an operating system or an application.

7. The method of claim 1, wherein the media resource comprises packages of media data, and wherein the communication is communicated on an internet protocol with a first protocol for the media data, a second protocol for controlling the media data, and a third protocol for the widget information, and wherein the first protocol comprises Real-time Transport Protocol (RTP), the second protocol comprises Real-time Control Protocol (RTCP), and the third protocol comprises a user interface control protocol based on XML, each of the protocols allocated for a part of a transmission bandwidth.

8. A system for a communication of a media resource, comprising:
   one or more processors;
   a memory coupled to at least one of the processors;
   a display having a display area;
   a set of instructions stored in the memory and executed by at least one of the processors, wherein the set of instructions perform actions of:
      generating at least a portion of the media resource;
      receiving a request, from a user of a first information handling system, for a user manipulation on the at least a portion of the media resource;
      receiving a selection, from the user, of at least one widget of a graphic user interface, wherein the at least one widget is dragged and dropped to a location on the at least a portion of the media resource;
      generating a widget information corresponding to the at least one widget in response to the request;
      associating the widget information with the at least a portion of the media resource;
      encoding the at least a portion of the media resource for a real-time exchange of communications between a plurality of information handling systems;
      transmitting the at least a portion of the media resource and the widget information from the first information handling system to at least one of the plurality of information handling systems.

9. The system of claim 8, further comprising a display having a display area, wherein the at least a portion of the media resource is shown on the display area.

10. A computer program product for a communication of a media resource, the computer program product stored in a computer memory, comprising computer instructions that, when executed by a first information handling system, causes the first information handling system to perform actions comprising:
   receiving a request, from a user of the first information handling system, for a user manipulation on at least a portion of the media resource;
   receiving a selection, from the user, of at least one widget of a graphic user interface, wherein the at least one widget is draqqed and dropped to a location on the at least a portion of the media resource;
   generating a widget information corresponding to the at least one widget in response to the request;
   associating the widget information with the at least a portion of the media resource;

encoding the at least a portion of the media resource for a real-time exchange of communications between a plurality of information handling systems; and transmitting the at least a portion of the media resource and the widget information from the first information handling system to at least one of the plurality of information handling systems.

11. The computer program product method of claim 10, wherein the widget information comprises an ID identifying the request, an ID identifying the at least a portion of the media resource, and information identifying the at least one widget related to the at least a portion of the media resource.

12. The computer program product of claim 10, wherein the first information handling system comprises a display and the display comprises a display area for displaying the at least a portion of the media resource and wherein the widget and the at least a portion of the media resource are simultaneously displayed on the display area.

13. The computer program product of claim 10, wherein the media resource comprises a media file, wherein one or more contents of the media file are selected from the group consisting of audio contents, still image contents, animation contents, video contents, text contents, and interactive contents.

14. The computer program product of claim 10, wherein the at least one widget comprises a component for displaying information and for inviting, accepting, and responding to user actions, and wherein the at least one widget is selected from the group consisting of buttons, icons, pull-down menus, radio buttons, selection boxes, progress indicators, check boxes, scrollbars, windows, window edges, toggle buttons, text inputs, and form inputs.

15. The computer program product of claim 10, wherein the graphic user interface is used for a user interaction with an operating system or an application.

16. The computer program product of claim 10, wherein the media resource comprises packages of media data, and wherein the communication is communicated on an internet protocol with a first protocol for the media data, a second protocol for controlling the media data, and a third protocol for the widget information, and wherein the first protocol comprises Real-time Transport Protocol (RTP), the second protocol comprises Real-time Control Protocol (RTCP), and the third protocol comprises a user interface control protocol based on XML, each of the protocols allocated for a part of a transmission bandwidth.

* * * * *